United States Patent [19]

Staaden

[11] 4,128,959
[45] Dec. 12, 1978

[54] FISHING PLANER

[76] Inventor: Adolf Staaden, 404 Hickory La., Forked River, N.J. 08731

[21] Appl. No.: 822,063

[22] Filed: Aug. 5, 1977

[51] Int. Cl.² ............................................. A01K 85/00
[52] U.S. Cl. ................................................. 43/43.13
[58] Field of Search ................... 43/43.13, 42.39, 43.14

[56] References Cited
U.S. PATENT DOCUMENTS

| 3,667,148 | 6/1972 | Dawson | 43/43.13 |
| 3,835,573 | 9/1974 | Borchardt | 43/43.13 |
| 3,971,154 | 7/1976 | Craig | 43/43.13 |

Primary Examiner—Harold D. Whitehead
Attorney, Agent, or Firm—Robert K. Youtie

[57] ABSTRACT

A fishing planer wherein a weighted bail is provided on a vane and a portion of the bail is held fast to the vane to resist working and loosening under the stresses imparted in active use.

8 Claims, 4 Drawing Figures

U.S. Patent  Dec. 12, 1978  4,128,959
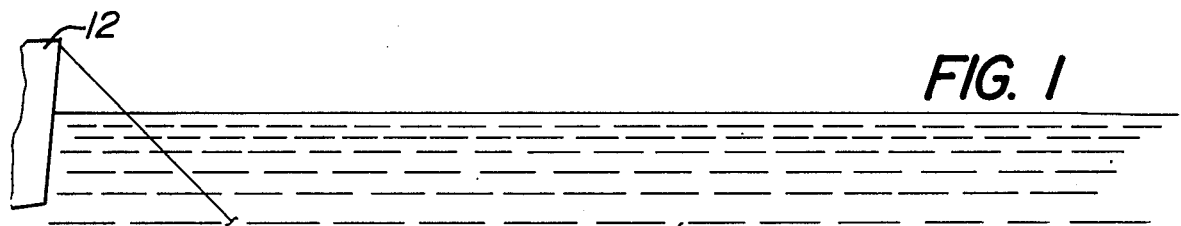
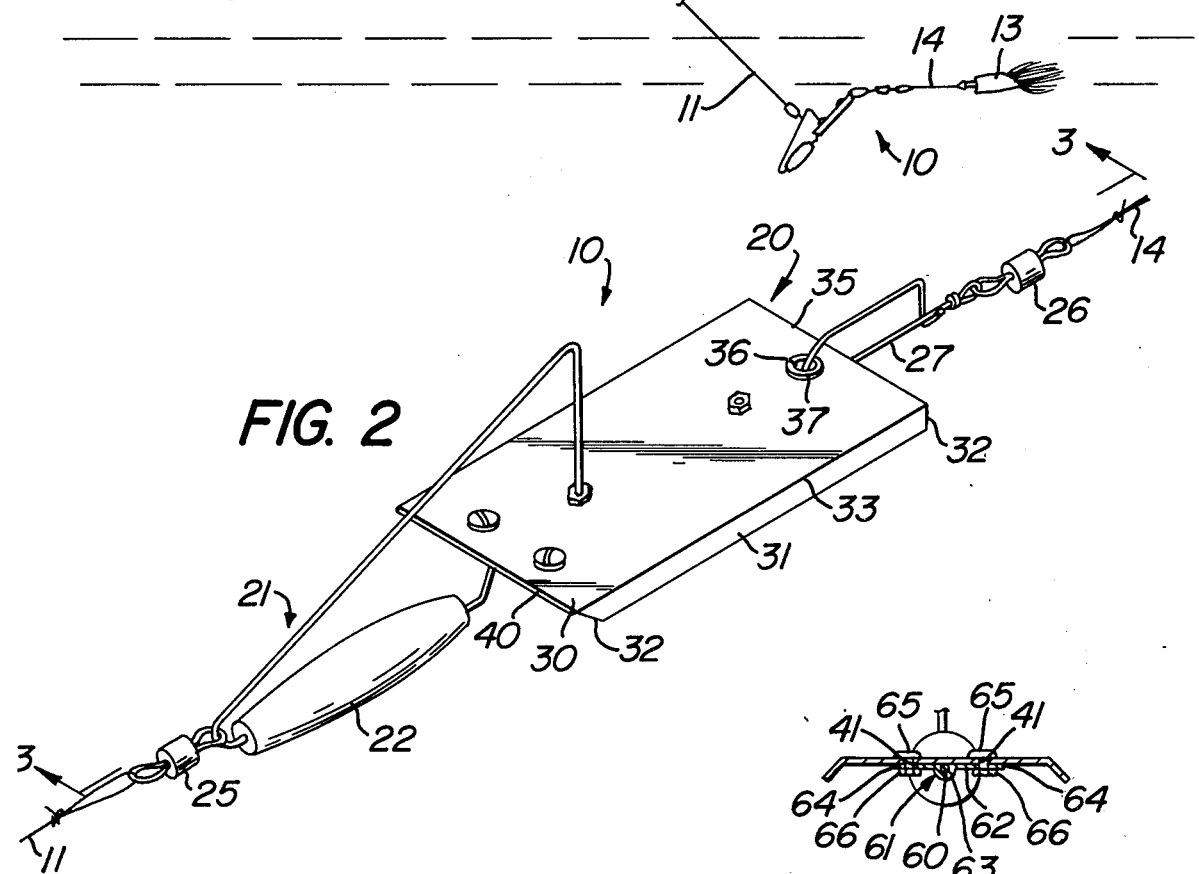
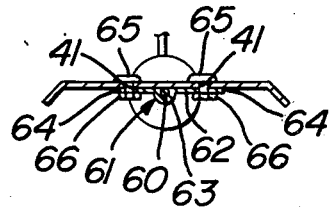
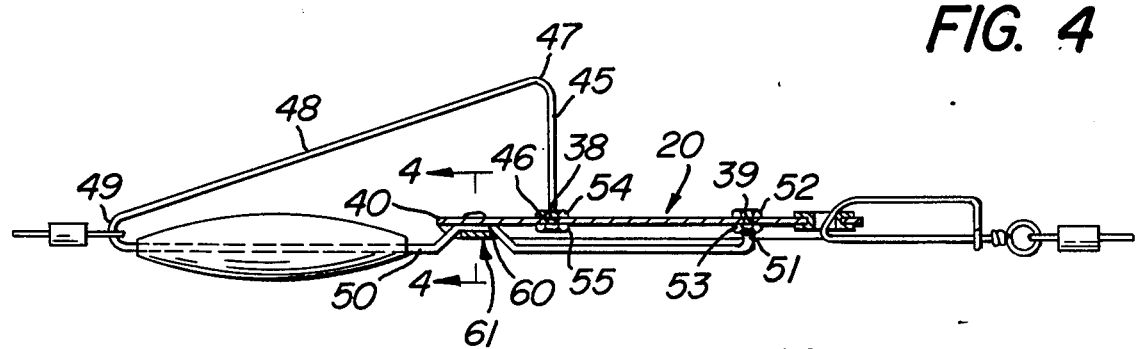

FISHING PLANER

BACKGROUND OF THE INVENTION

While the art of fishing planers, sometimes called seakites is highly developed, in conventional planers there remain the tendency of the planer to work and twist the bail loose from the vane, which working may result from normal and desirable lure action during trolling. Hence, prior fishing planers have heretofore required relatively expensive assembly, as by welding or the like, or been subject to relatively rapid loosening and malfunction, requiring repair or replacement of parts.

SUMMARY OF THE INVENTION

Accordingly, it is an important object of the present invention to provide a new and highly improved fishing planer construction which overcomes the above-mentioned difficulties, substantially eliminates the possibility of working or racking of the assembled planer, even under extreme conditions of use, so that a longer and more effective useful life is achieved.

It is another object of the present invention to provide a unique fishing planer construction having the advantageous characteristics mentioned in the preceding paragraph, which is relatively economical to produce, does not require welding or other expensive fastening means, runs true and straight in trolling so as not to affect the desired lure action, and which eliminates the need for expensive fastening procedures, such as welding, soldering or the use of chemicals.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an elevational view showing a fishing planer of the present invention in operative trolling condition, the fishing line being broken away to conserve drawing space.

FIG. 2 is a top perspective view, enlarged for clarity, showing the fishing planer of FIG. 1 in a tripped condition.

FIG. 3 is a longitudinal sectional elevational view taken generally along the line 3—3 of FIG. 2.

FIG. 4 is a transverse sectional elevational view taken generally along the line 4—4 of FIG. 3.

DESCRIPTION OF THE PREFERRED EMBODIMENT

Referring now more particularly to the drawings, and specifically to FIG. 1 thereof, a fishing planer is there generally designated 10, as being trolled by a fishing line 11 behind a fishing boat 12. Extending aft the planer 10 may be a lure or bait 13, connected to the aft end of planer 10 by a leader or line 14.

The planer 10 is best seen in FIGS. 2–4, and it would there be apparent that the planer includes a generally flat vane, blade or plate 20, which serves the hydrodynamic function of guiding the planer obliquely downwardly, in the usual fashion. A bail or loop is generally designated 21, and may be formed of suitable wire or rod stock extending generally forwardly from and beyond the vane 20. The planar 10 is weighted forwardly, as by a lead, mass or weight 22 carried by the bail 21 forwardly of the vane 20.

The line 11 is connected, as by a swivel 25 to the bail 21, the swivel being slidable on the bail as will appear more fully hereinafter.

The leader 14 may be connected, as by a swivel 26 and clip or snap 27 to a rearward region of the vane 20.

Considering now the planer 10 in greater detail, the vane 20 may be constituted of a generally elongate, substantially rectangular flat member or plate 30 having its longitudinal side margins or edge portions 31 formed with forward and rearward oblique edges or bevels 32 and bent, as along a bend line 33 to provide an obliquely downwardly and outwardly extending longitudinal edge portion or rib.

Generally along the longitudinal center line of plate or vane 20, adjacent to the rearward vane edge 35, is a through hole 36, say being bounded by an eyelet 37, for removably receiving therethrough the openable snap connector 27.

In addition, also along the longitudinal center line of vane 20, the plate thereof is formed with a pair of forwardly and rearwardly spaced through holes 38 and 39, see FIG. 3. The rearward through hole 39 is spaced adjacent to and forwardly of the lure connection opening 36 while the forward through hole 38 is located adjacent to and spaced rearwardly from the front plate edge 40.

Additionally, spaced equally on opposite sides of the longitudinal center line of vane 20, adjacent to the forward vane edge 40, there are provided a pair of through openings or holes 41. The opening or holes 41 are spaced forwardly of the forward laterally medial opening 38, and equally spaced from the forward vane edge 40.

The bail 21 may be integrally formed, or otherwise suitably fabricated, say of wire or rod stock, and may include a generally straight upstanding bail portion 45 having its lower region 46 externally threaded and received in forward laterally medial vane hole 38. The upstanding bail portion 45 terminates at its upper end in a forwardly arcuate portion or bend 47, from which extends a generally straight obliquely declining bail portion 48. The declining bail portion 48 extends beyond the forward end 40 of vane 20 to a forward bail region 49 which is of rearwardly bent or arcuate configuration terminating at a level below the under side of vane 20. Extending rearwardly from the arcuate forward bail region 49 is a lower bail region 50 lying in a vertical plane generally coplanar with upstanding bail portion 45 and declining bail portion 48 and lying in a horizontal plane generally parallel to and spaced below the horizontal plane of vane 20. The lower bail portion 50 extends rearwardly, in spaced relation beneath the under side of vane 20, along and in general parallelism with the vane, located in the plane of the center line, to a rearward bail region 51 which is bent to extend upwardly and through the rear vane opening 39. The rear vane region 51 is externally threaded and provided on opposite sides of the vane 20 with upper and lower internally threaded fasteners or clamping nuts 52 and 53 in clamping engagement with the vane 20. Similarly, the threaded portion 46 of upstanding bail portion 45 may be circumposed by internally threaded fastening elements or clamping nuts 54 and 55 on opposite sides of and in clamping engagement with the intermediate portion of vane 20. The threaded portions of rearward bail region 51 and upstanding bail region 46, as well as nuts 52-55 may all be conventional, say of righthand thread, for economy and ease of assembly.

An intermediate region 60 of lower bail portion 50, say beneath the forward portion of vane 20, may be upset or offset upwardly to extend longitudinally along and in bearing engagement with the under side of vane 20, say along the longitudinal center line thereof. The upset or upwardly offset bail region 60 may advantageously located forwardly of upstanding bail portion 45, as between the latter and front vane edge 40, in generally coplanar relation with but normal to the rearward and upstanding bail regions 51 and 45.

Fastening means, generally designated 61, are provided to secure the upset intermediate bail portion 60 fast to the under side of vane 30. An advantageous fastening means is that illustrated, being constituted of an elongate strip or strap 62 extending generally laterally, transversely or normal to the longitudinal axis of vane 30, on the under side thereof adjacent to the forward vane edge 40. The strip or strap 62 may include a medial portion 63 of generally arcuate, upwardly concave configuration for close conforming extension approximately 180° about the under side of offset intermediate bail region 60. From the arcuate or curvilinear intermediate strap portion 63, may extend oppositely laterally outwardly a pair of strap distal or end portions 64, each in facing engagement with the under surface of the vane or plate 30.

At equally spaced locations on opposite sides of the longitudinal center line of vane 30, adjacent to and spaced rearwardly from the front vane edge 40, there may be provided securement means or fastener elements 65 being illustrated as a pair of machine screws each depending through the vane and a respective strap end portion 64, for engagement of a mating fastener element or nut 66 on the lower end of each screw. Thus the securement elements 65 and 66 effectively maintain the strap end portion 64 clamped in facing engagement with the under side of vane 30, while the intermediate strap region 63 closely engages at least half-way about the received bail portion 60 to hold the latter against any longitudinal or transverse displacement.

In view of the foregoing, it will now be appreciated that any action by lure 13, such as the desired oscillatory movement, or undesired movement as may be effected by the hooking of debris, which may cause the planar 10 to be stressed transversely, will be incapable of transmission to the bail end regions 51 and 45, and the fastener means therefor, so that the planar remains relatively rigid and firmly fastened in its properly assembled relation. More specifically, by the firm clamping action of fastener means 61 to hold the intermediate bail region 60 against the vane 30, and preclude relative movement therebetween, the bail end regions 45 and 50 are held against rotation relative to the vane, so that the holding elements or nuts 52-55 cannot be worked loose. Of course, relative movement of the vane 30 with respect to the bail 21 about the longitudinal center line of the vane is prohibited by entry of the bail end portions 46 and 51 through respective vane holes 38 and 39. Hence, all directions of relative movement between bail 21 and vane 20 are effectively prevented.

Although the present invention has been described in some detail by way of illustration and example for purposes of clarity of understanding, it is understood that certain changes and modifications may be made within the spirit of the invention.

What is claimed is:

1. A fishing planer comprising a vane, an upstanding bail portion upstanding from said vane to an upper bail region, upper securement means securing said upstanding bail portion to said vane, a declining bail portion declining from said upper bail region forwardly beyond said vane to a forward bail region, a lower bail portion extending rearwardly from said forward region beneath said vane to a rearward bail region, lower securing means securing said rearward bail region to said vane, weight means on said lower bail portion adjacent to said forward bail region, and fastener means fastening an intermediate bail region of said lower bail portion to said vane, to effectively minimize the stress imparted to said upper and lower securing means.

2. A fishing planer according to claim 1, said upper and lower securing means each comprising internally threaded members in threaded engagement about the respective adjacent bail region in clamping engagement with opposite sides of said vane.

3. A fishing planer according to claim 1, said lower portion being spaced below said vane, and said fastener means fastening said intermediate bail region against the under side of said vane.

4. A fishing planer according to claim 3, said fastener means comprising a strap securing said intermediate bail region longitudinally along and against said vane.

5. A fishing planer according to claim 1, said upstanding bail region and its upper securing means being spaced forwardly of said rearward bail region and its lower securing means, and said fastener means being forward of said upper securing means.

6. A fishing planer comprising a vane, a bail of loop-like configuration extending beyond one end of said vane for slidably carrying a line connector, a mass carried beyond said one vane end for weighting the latter, and fastener means fastening spaced regions of said bail to said vane, one of said fastener means comprising a receiving strap portion conformably extending at least 180° about one of said bail regions with said one bail region extending along said vane, and securement strap portions extending from said receiving strap portion in facing engagement with said vane for securement thereto.

7. A fishing planer according to claim 6, said one bail region extending longitudinally of said vane adjacent to said one vane end.

8. A fishing planer according to claim 7, the other of said spaced bail regions extending through said vane generally normal to said one bail region, to resist bail movement in all directions.

* * * * *